United States Patent [19]
Peddinghaus

[11] 3,917,244
[45] Nov. 4, 1975

[54] LOAD-BEARING COMPRESSION LEG
[76] Inventor: Carl Ullrich Peddinghaus, Obere Lichtenplatzer Strasse 276, Wuppertal-Barmen, Germany
[22] Filed: Aug. 1, 1974
[21] Appl. No.: 493,859

[30] Foreign Application Priority Data
Mar. 8, 1973   Germany............................ 2339355

[52] U.S. Cl...................................... 267/34; 267/8
[51] Int. Cl.² ........................................ B60G 11/56
[58] Field of Search................... 267/34, 8, 63 R, 65

[56] References Cited
UNITED STATES PATENTS
3,603,574   9/1971   Lutz...................................... 267/34
3,817,506   6/1974   Jarret................................ 267/63 R

*Primary Examiner*—James B. Marbert
*Attorney, Agent, or Firm*—Holman & Stern

[57] ABSTRACT

A load-bearing compression leg includes a spring and a hydraulic vibration damper which is fitted in the direction of operation of the spring and has a cylinder in which a damping piston fixed to a piston rod can move, and in which there is an equalisation space for the damping fluid displaced by the piston rod. A displaceable sealing separating piston separates the equalisation space from a further space in which is received a further vibration damper. The further vibration damper is of smaller dimensions than the first mentioned vibration damper and at one end engages the surface of the separating piston remote from the equalisation space, the other end of the further vibration damper being secured to the base of the cylinder of the first mentioned vibration damper. The stroke of the further vibration damper corresponds to that of the separating piston and the further vibration damper includes an equalisation space which, in use, receives pressurised gas.

5 Claims, 1 Drawing Figure

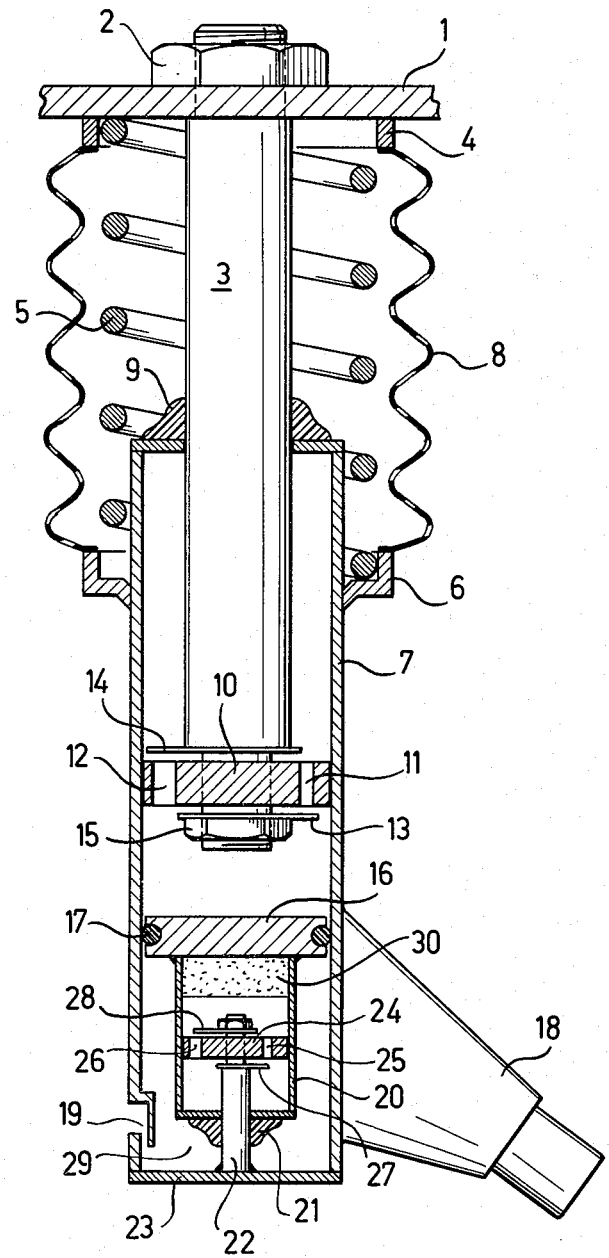

LOAD-BEARING COMPRESSION LEG

This invention relates to a load-bearing compression leg of the kind including a spring, and a hydraulic vibration damper which is fitted in the direction the spring acts and has a cylinder in which a damping piston moves and is fastened to a piston rod, and in which there is an equalisation space for the volume of damping fluid displaced by the piston rod.

Load-bearing compression legs of the kind specified are used mainly in vehicles. They are fastened at one end to the vehicle chassis, and at the other end carry the steering knuckle pin for a road wheel. Then, owing to the hydraulic damping, the vibrations which arise from the unevenness of the road are very well damped. With correspondingly varying value openings in the damping piston the vibration damper can be pushed in with less force than subsequently pushed out.

With compression legs of this kind, in order to guarantee predetermined damping characteristics with large vibration frequencies and amplitudes, it is necessary to prevent cavitation inside the hydraulic fluid, i.e. usually in the oil, as the valve openings designed for the fluid flow are affected by such cavitation and would create considerably less damping force. In addition, cavitation causes increased wear after prolonged use. It is therefore known in load-bearing compression legs of the kind specified for the equalisation space to be filled with a gas under high pressure, that is of the order of 25 to 80 atmospheres. The damping fluid is therefore continually under a high pressure, so that even under extreme loads cavitation does not occur since the high pressure of the damping fluid guarantees reliable damping. However, this known arrangement suffers from a disadvantage which arises from the fact that compression legs are subject to considerable bending and kinking loads during operation. Thus, although these loads can be catered for by using piston rods of increased dimensions and strength (eg. with a diameter of e.g. 20mm or more), this results in a corresponding increase in the discharge force applied to the piston rod by the high pressure damping fluid. Thus considerable effects result for the spring force, the compression leg works increasingly harder, and moreover, this effect becomes more obvious in long journeys, as the volume of gas becomes warm.

It is therefore an object of the invention to provide a load-bearing compression leg of the kind specified in which the aforesaid problems are minimised and/or alleviated.

Accordingly the invention resides in a load-bearing compression leg, including a spring, a hydraulic vibration damper which is fitted in the direction of operation of the spring and has a cylinder in which a damping piston fixed to a piston rod can move, and in which there is an equalisation space for the damping fluid displaced by the piston rod, and a displaceable sealing separating piston separating said equalisation space from a further space in which is received a further vibration damper, said further vibration damper being of smaller dimensions than the first mentioned vibration damper and at one end engaging the surface of said separating piston remote from the equalisation space, the other end of said further vibration damper being secured to the base of the cylinder of the first mentioned vibration damper, the stroke of the further vibration damper corresponding to that of the separating piston, and said further vibration damper including an equalisation space which, in use, receives pressurised gas.

The accompanying drawing is a schematic representation partly in section of a load bearing compression leg according to one example of the invention.

Referring to the drawing, the compression leg includes a first vibration damper having a piston rod 3 which at one end is fixed to the vehicle chassis 1 in conventional manner, for example by means of a nut 2, and which at its other end extends into a cylinder 7 of the first vibration damper. Inside a flange 4 on the chassis 1, one end of a spring 5 is supported, the other end of the spring 5 bearing against a plate 6 which is fixed to the cylinder 7. Between the plate 6 and the flange 4 there is a bellows 8 for preventing the entrance of impurities into a piston rod seal 9 which prevents escape of damping fluid from the cylinder 7 in use.

At its other end the piston rod 3 carries a damping piston 10, which has different valve openings 11 and 12. Covering the valve opening 12 is a valve plate 14, which is held elastically between the piston 10 and a shoulder at said other end of the piston rod 3, while a further plate 13 covers the opening 11 and is elastically held between the damping piston 10 and a piston rod nut 15. In use, when the piston rod 3 is moving into the cylinder 7, the valve opening 12 is uncovered by lifting of the valve plate 14; whereas when the piston rod 3 is moving out of the cylinder 7 the valve opening 11 is uncovered by lifting of the valve plate 13. As shown in the drawing, in the first case there is a larger flow opening than in the second case, so the damping effect is correspondingly varied.

Also received in the cylinder 7 is a displaceable separating piston 16 which separates the equalisation sapce of the first vibration damper from a further space 29 and for which there are provided seals 17, to prevent the damping fluid in the equalisation space of the cylinder 7 from escaping. The ratio of the cross-section of the separating piston 16 to that of the piston rod 3 determines how much the axial displacement of the separating piston 16 is reduced compared with that of the piston rod 3.

On the outer wall of the lower end of the cylinder 7 is the steering knuckle pin 18, which is designed in the usual way with a pin for carrying a wheel. An opening 19 is also provided in said outer wall of the cylinder 7 so that the space 29 formed by the lower part of the cylinder 7 can be vented to atmosphere.

A cylinder 20 of a second, smaller vibration damper is fixed to the underside of the separating piston 16 so as to be received in the space 29 and extending from the cylinder 20 through a seal 21 is a piston rod 22, which is fixed to the base 23 of the cylinder 7. The stroke or the further vibrating damper is therefore equal to that of the piston 16. At its end remote from the base 23, the piston rod 22 carries a further damping piston 24, which has valve openings 25 and 26. The valve openings 25, 26 are partly covered with the aid of the valve plates 27 and 28, so there are opening regions which are always free and can thus allow fluid to flow in either direction to and from the equalisation space 30 of the second vibration damper. In use, the space 30 receives pressurised gas, while the space 29 is at substantially atmospheric pressure.

The ventilation opening 19 has an inner cover, so that deposits of dust cannot lead to the piston rod 22 or the sealing area of the separating piston 16 becoming dirty. A further aid against dirt, which also serves to improve cooling, is to connect the opening 19 with the inside of the sealing bellows 8.

It is to be appreciated that in the compression leg described above, the pressurised gas, which in conventional arrangements would normally occupy the space 29 is replaced by a further vibration damper. This further vibration damper, in accordance with its smaller dimensions, has in particular the piston rod 22 which has a smaller diameter than that of the piston rod 3 of the larger, first vibration damper. Thus, although the gas in the equalisation space 30 of the further vibration damper is under the high pressure usual in conventional arrangements, it exerts a relatively small discharge force to the smaller diameter, e.g. 8mm, of the piston rod. In the region of small vibration amplitudes and frequencies the further vibration damper presses with the above mentioned force, produced practially only by the pressure of the enclosed gas, on the separating piston 16. This force is not completely sufficient to prevent cavitations in the damping fluid of the first, larger vibration damper. As this force must be referred to the surface of the separating piston 16 to determine the pressure of the damping fluid in the first vibration damper, there is only a comparatively low pressure of a few atmospheres with which to act on the considerably larger piston rod 3 of the first vibration damper, to achieve its discharge force. In normal operation the latter discharge forces stays so low even after a long time and when the pressurised gas is heated that there is no notable effect on the spring characteristic. If larger vibration amplitudes or frequencies suddenly appear then of course the further vibration damper begins to exert its influence on the overall damping characteristic in a manner which depends on the forces required for the further opening of the valves 25, 26 in the damping piston 24 of the smaller vibration damper. Thus if the valve plates 27, 28 are resiliently urged under high tension to cover the valve openings 25, 26 correspondingly larger forces are necessary to give movements with the smaller vibration damper, which is noticeable in the method of operation of the larger vibration damper in that its damping fluid is then under a correspondingly increased pressure and is prevented from cavitation. Of course, in the arrangement described above only the strong inlet forces caused by large vibration amplitudes result in the valve plates 27, 28 being lifted to further open the valves 25, 26 since in the region of normal frequencies and amplitudes fluid is able to flow freely through the portions of the valve openings 25, 26 which are continually open.

It is to be noted that in arrangements of the above example, the steering knuckle pin 18 is on the cylinder 7 of the larger vibration damper. This arrangement is advantageous since it allows better bracing of the bending moments which occur in use. Also it will be seen that in the above example, the closed base of the cylinder 20 of the smaller vibration damper is secured to the separating piston 16, while the piston rod 22 extends from the opposite end of the cylinder 20. This arrangement is preferred because the pressurised gas in the space 30 is sealed off by the damping fluid of the smaller vibration damper. It is also advantageous to arrange that the piston rod 22 of the smaller vibration damper has a length which is only a fraction of that of the piston rod 3 of the larger vibration damper.

It is to be appreciated that in the above example since the smaller vibration damper places the damping fluid of the larger vibration damper in normal operation under low pressure, even a rise in temperature of the pressurised gas in the smaller vibration damper after a long period of operation does not lead to noticeable deterioration of the effect of the compression leg. However, in the arrangement described any overheating of said pressurised gas is minimised by the provision of the ventilation openings 19 in the cylinder 7 at region thereof adjacent the smaller vibration damper.

I claim:

1. A load-bearing compression leg, including a spring, a hydraulic first vibration damper which is fitted in the direction of operation of the spring and has a cylinder in which a damping piston fixed to a piston rod can move and in which there is an equalisation space for the damping fluid displaced by the piston rod, a displaceable sealing separating piston separating said equalisation space from a further space in which is received a hydro-pneumatic vibration damper, said hydro-pneumatic vibration damper being of smaller dimension than the first vibration damper and having a piston rod of smaller diameter than said piston rod of said first vibration damper, and said hydro-pneumatic vibration damper at one end engaging the surface of said separating piston remote from the equalisation space, the other end of said hydro-pneumatic vibration damper being secured to the base of the cylinder of the first vibration damper, the stroke of said hydro-pneumatic vibration damper being of the same length as that of the separating piston, and said hydro-pneumatic vibration damper including an equalisation space which, in use, receives pressurised gas.

2. A load-bearing compression leg as claimed in claim 1, wherein the cylinder of the first vibration damper carries a steering knuckle pin for receiving a vehicle wheel.

3. A load-bearing compression leg as claimed in claim 1, wherein the hydro-pneumatic vibration chamber includes a cylinder which is firmly connected at a closed base thereof to the separating piston, and further includes a piston which extends from the end of the cylinder remote from said closed base.

4. A load-bearing compression leg as claimed in claim 1, wherein the hydro-pneumatic vibration damper includes a damping piston having openings through which fluid can flow freely in both directions.

5. A load-bearing compression leg as claimed in claim 1, wherein the cylinder of the first vibration damper has one or more ventilation openings communicating with said further space.

* * * * *